T. W. CROSS.
SAW SWAGING AND SHAPING DEVICE.
APPLICATION FILED MAR. 24, 1908.
941,131.
Patented Nov. 23, 1909.
2 SHEETS—SHEET 1.
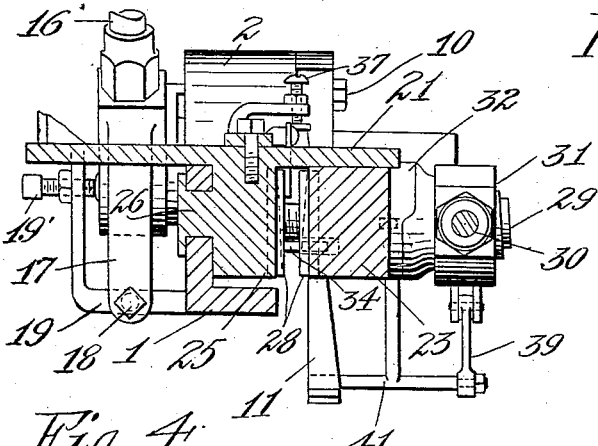
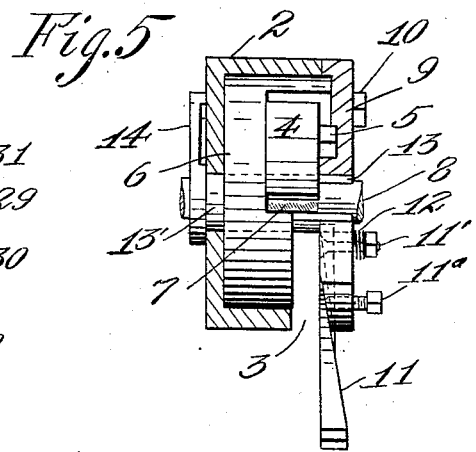
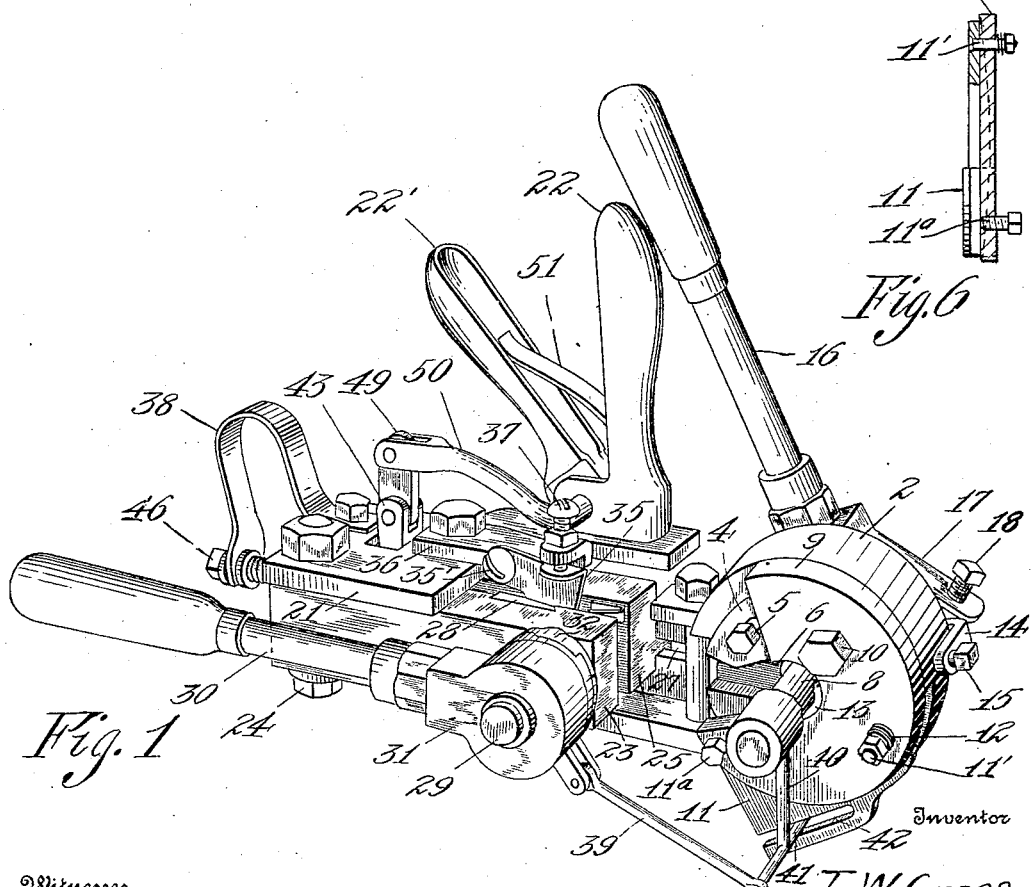
Witnesses
Arlita Adams
E. W. Cressman
Inventor
T. W. Cross
By Adams & Brooks
Attorneys

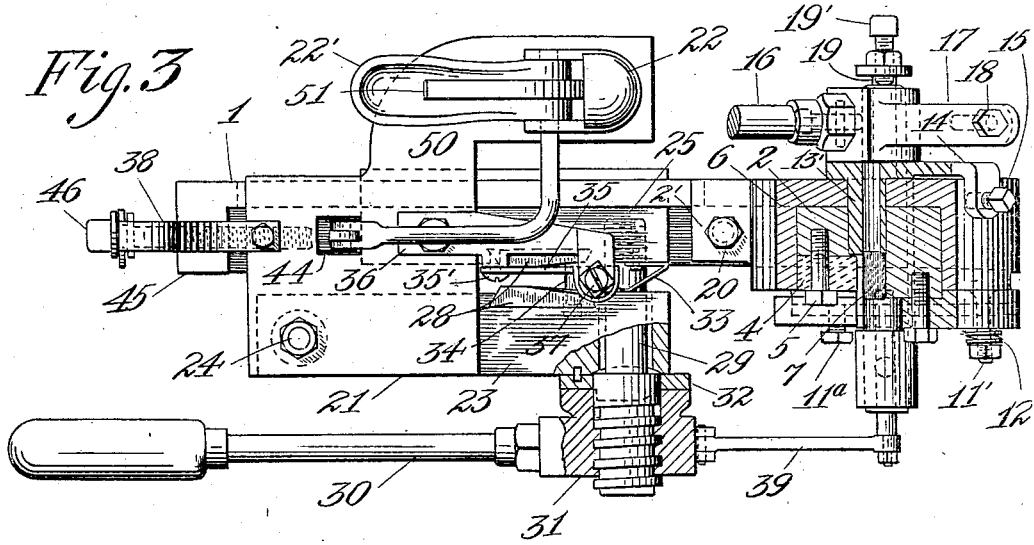
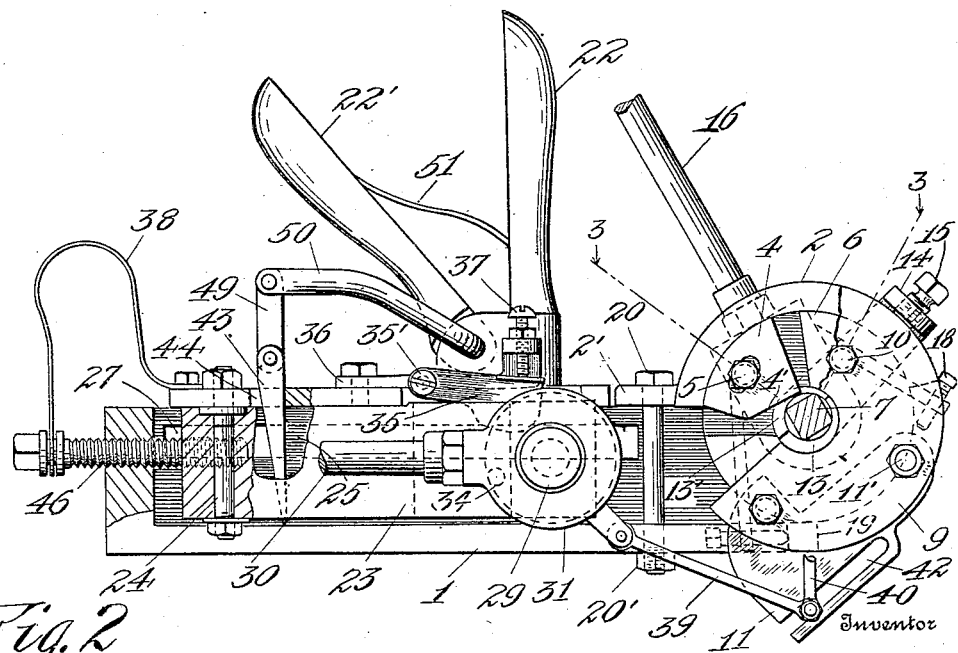

UNITED STATES PATENT OFFICE.

THEODORE W. CROSS, OF EVERETT, WASHINGTON.

SAW SWAGING AND SHAPING DEVICE.

941,131.      Specification of Letters Patent.    Patented Nov. 23, 1909.

Application filed March 24, 1908. Serial No. 423,017.

*To all whom it may concern:*

Be it known that I, THEODORE W. CROSS, a citizen of the United States of America, and a resident of the city of Everett, in the county of Snohomish and State of Washington, have invented certain new and useful Improvements in Saw Swaging and Shaping Devices, of which the following is a specification.

My invention aims to provide a device of the above character which can be operated in an efficient manner to swage one tooth and shape a previously swaged one without necessitating adjustment or movement of the device on the saw after it has been properly secured in position.

A further object resides in the novel construction of the saw swaging device, through the medium of which the extent of swage to be given to the teeth can be regulated.

Other objects will be set forth as the description progresses, and those features of construction, arrangement and combinations of parts, in which my invention resides, succinctly pointed out in the claims hereto annexed.

Referring now, to the accompanying drawings, in which like numerals of reference indicate like parts throughout the several views: Figure 1 is a view in perspective of a saw swaging and shaping device embodying my invention. Fig. 2 is a view in side elevation thereof, with parts being broken away. Fig. 3 is a view partly in top plan, with portions broken away, and partly in section taken on line 3—3 of Fig. 2. Fig. 4 is a transverse sectional view taken through the frame and carriage, the hand grips being removed. Fig. 5 is a fragmentary detail view of the swaging device, the housing being shown in section, and Fig. 6 is a detail sectional view of the removable plate of the anvil carrier, and the saw holding member pivotally supported thereon.

In carrying out my invention, I provide a frame 1, consisting of a side wall and a bottom wall, as clearly shown in Fig. 4, said bottom wall being disposed so that its free longitudinal edge portion will normally bear against the side face of the saw and serve as a guide for the device. At one end of frame 1 is a housing 2, the same consisting of a curved wall, preferably formed integral with frame 1 and being of greater width than the bottom wall thereof. Housing 2 is formed in its lower side with a cutout to provide, in conjunction with a plate 9, a slot 3, (see Fig. 5) disposed in alinement with the free longitudinal edge of frame 1, whereby the saw while being firmly held against said bottom wall of the frame, can have its teeth projected into housing 2.

Reference numeral 4 indicates an anvil adjustably secured by bolt 5, on a carrier 6, arranged in housing 2, and 7 indicates the swaging die. By loosening bolt 5, anvil 4 can be adjusted on the carrier. This adjustment however, is obviously of a very limited nature, and therefore in order to obtain a greater adjustment for the anvil, I mount carrier 6 so that it can be rotated bodily in the housing, as will be hereinafter more fully set forth.

Swaging die 7, while it may be otherwise constructed, preferably consists of an intermediate portion of a shaft 8, supported for rotation in carrier 6, said die being provided by forming said shaft with depressions to form one or more substantially flat swaging surfaces, as clearly illustrated in Fig. 2, between one of which and the opposed edge 4' of the anvil, the teeth of the saw are swaged.

Reference numeral 9 indicates a plate arranged over the open side of housing 2, and removably secured to carrier 6, as by a screw 10. Plate 9 is cut out, as clearly shown in Figs. 1 and 2, so that the die and anvil are always in view. The lower portion of plate 9, which forms the outer wall of slot 3 of the housing, has its inner face beveled slightly to guide a member 11, employed for holding the saw, firmly against the carrier during a swaging operation. Member 11 is pivoted by a bolt 11', slidably arranged in plate 9, and has its outer face inclined so that as it is swung upwardly, it moves laterally and acts as a wedge to hold the saw at a point immediately below the upper portion of the tooth to be acted upon. A spring 12, arranged on bolt 11' draws member 11, during its downward movement, away from the saw. By adjusting a set screw 11ª, mounted in plate 9, inwardly, the movement of member 11 toward carrier 6 can be increased, as is apparent.

Reference numeral 13 indicates an eccentric, in the form of a sleeve, in which shaft 8 is journaled. This eccentric projects through carrier 6, being cut out at 13' so that die 7 can engage the saw tooth, and is provided on one end with an arm 14 in which is arranged a set screw 15, normally engaged with housing 2 for preventing accidental turning of the eccentric. Upon turning of eccentric 13, the position of die 7, relatively to the anvil 4, will be altered, as will readily be understood.

Reference numeral 16 indicates an operating lever, fixed to one end portion of shaft 8 and provided with opposite outwardly projecting arms 17, having adjustable stops 18 arranged for engagement with an abutment 19, consisting of a bracket fixed to housing 2 and provided with a set screw 19' engaged with the end of shaft 8 to prevent outward movement thereof. A bolt 20 projects through a flange 2' of housing 2 and through the bottom wall of frame 1 and is provided with a nut 20' for springing the free portion of housing 2 so that it will bind on carrier 6 and thereby normally hold the same against turning.

Reference numeral 21 indicates a carriage supported on frame 1 for sliding toward and from the swaging device, said carriage, in the present embodiment of my invention, consisting of a substantially flat plate (see Fig. 4) arranged to bear on the side wall of frame 1 and projecting outwardly on opposite sides of said frame to provide means of support for the relatively fixed and movable hand grips 22, 22' respectively, and for the movable jaw 23 of the shaping device, pivoted by bolt 24. Depending from the underface of carriage 21 and fixed thereto, is the fixed jaw 25 of the shaping device, the same being provided on its outer face with a flanged tongue 26, slidably engaged in a longitudinally disposed slot 27, formed in the side wall of frame 1. Jaws 23 and 25 are provided on their opposing faces with removable die blocks 28 for shaping the saw teeth after they have been swaged.

Reference numeral 29 indicates a stub shaft, having one end secured in jaw 25 and projecting through a suitable opening provided therefor in jaw 23 and having its free end portion threaded, as shown. An operating handle, as 30, is provided with a nut part 31 arranged on the threaded end portion of the stub shaft, said nut part being provided on its inner side face with a cam surface (see Fig. 1) adapted to ride over a similar cam surface of a part 32, held to movable jaw 23 against turning thereon, during rotation of said nut part, whereby swinging of the movable jaw to a closed position, will be effected. A spring 33 moves jaw 23 to an open position, when handle 30 is swung back to its normal position.

Reference numeral 34 indicates a horizontally disposed pin adapted for engagement in the throats of the teeth, and 35 indicates a gage adapted for engagement with the top edge portions of the teeth, both of which devices insure of the teeth to be shaped, being properly positioned between the shaping dies, as will be more fully explained in the following. Pin 34 is fixed at one end to the lower portion of the die block 28 of the fixed jaw and has its other end received in an opening of suitable depth formed in the die block of the other jaw. Gage 35 consists of a body of suitable shape which is pivoted, as by a screw 35', engaged in a plate 36 secured to carriage 21, which screw can be tightened sufficiently to hold the gage against lowering. A stop 37, consisting of a set screw mounted in an angularly disposed lug of plate 36, serves to prevent gage 35 moving upwardly when a tooth of the saw is engaged therewith.

Reference numeral 38 indicates a spring for holding the carriage in an advanced position.

Now, in the operation of the mechanism described, it being presumed that the device has been arranged on the saw so that one tooth is engaged on the face 4' of the anvil 4 and another (a previously swaged one) is arranged between jaws 23 and 25, hand grips 22, 22' are grasped and the carriage then slid away from the swaging device until pin 34 strikes the forward edge of the tooth to be shaped. The shaping device having now been positioned properly relatively to the saw tooth, handle 30 is swung upwardly thereby effecting closing of jaws 23 and 25, during which operation the shaping of the tooth is effected by the blocks 28. The jaws 23 and 25 during the operation just described constitute virtually an auxiliary clamp whereby the carriage is secured in place with respect to the tooth being shaped. During the partial rotation of nut part 31, member 11 has been simultaneously swung so as to firmly engage the saw and steady the same in proximity to the point where the swaging operation is to take place, such movement of member 11 being effected by means of a link 39, pivotally connected to nut part 31 and to a swing arm 40, which swing arm is suspended from shaft 8 and provided with a laterally extending arm 41 engaged in a slot 42 of said member. Handle 16 is now swung to swage the tooth resting on anvil 4. During swaging of the teeth, frame 1 must be firmly held against sliding forwardly on the carriage, and therefore I provide, in addition to member 11, a chock 43 which prior to the swaging operation, is lowered through an opening 44 in carriage 21 so as to have a snug fit between the rear end of fixed jaw 25 and the transverse wall 45 of frame 1. In lieu of directly engaging wall 45, chock 43 engages a screw 46, projecting through said wall, as shown clearly in Figs. 2 and 3.

Inasmuch as the movement of carriage 21 varies, this being due to the fact that the spaces between the forward edges of adjacent teeth are not as a rule of uniform width, I form the chock in the shape of a wedge. The chock, as now considered, is connected by a link 49 to an arm 50, fixed to swing with hand grip 22', which hand grip is operated by a spring 51 to normally hold the chock in lowered position.

By virtue of the devices just described it will be apparent that even though irregularities may occur as to distance between teeth, both the swaging and shaping mechanisms will be properly positioned by a simple rearward movement of the handle 22, and that while the shaping of a tooth is being effected the two sets of clamping devices are simultaneously made operative to not only secure both the carriage and frame to different points of the saw to prevent relative movement between them but also any tendency of the rear portion of the frame to tilt upward due to the force applied to the swaging lever 16 is prevented.

After the swaging operation, the device is released from the saw, then moved forwardly and positioned for operation on the teeth next to those just operated upon.

In regard to that feature of the present invention involving the provision of means, consisting of the carriage, whereby the shaping mechanism is adapted for adjustment bodily with relation to the swaging mechanism, it may be observed that the teeth of a saw after being sharpened a number of times become unequally spaced apart because portions thereof are filed away during the sharpening operations, and hence the adjustment of the shaping devices in the present invention is a feature of important advantage in compensating for the unequal spacing of the teeth and permitting of rigidly mounting the machine with respect to the saw. In positioning the machine with relation to the saw the wedge member 11 is a particularly desirable device because when in operative engagement with the saw said device supports the tooth to be swaged in such a way that the same cannot wabble during the swaging operation, and because the wedge has such a broad bearing against the side of the tooth.

The anvil 4, to serve in an efficient manner, must be removed from time to time, to have its active face ground, and when on the carrier 6 must be positively secured in its true position. The angular set of the anvil is obtained by adjustment of the carrier 6, and the eccentric 13 is designed to adjust the operative position of the die 7 toward and from the anvil, to increase or decrease its swaging action. This adjustment is primarily made to compensate for wearing away of the active face of the anvil, it being desirable to provide a machine wherein the anvil is not adjustable for the above purpose, and because more efficient results may be obtained when the anvil cannot be displaced from its true position by any radial movement thereof. The adjusting eccentric 13 operates to vary the swaging action of the die 7, and without disturbing the true set of the anvil.

In devices of the class of the present invention where the anvil is adjusted with relation to the die, the true set of the anvil changes with resultant disadvantages.

Having thus fully described my invention, what I claim as new and desire to secure by Letters Patent of the United States, is:

1. In a device of the class described, a carrier, an anvil mounted thereon, a rotatable swaging die supported on said carrier for co-operation with the anvil, means for actuating said die, means for adjusting the die with respect to the anvil to vary the swaging action of these parts, and means permitting of adjustment of the anvil substantially in the arc of a circle generated about the axis of the die as a center.

2. In a device for operating on saw teeth, a housing formed with an opening through which the teeth of a saw are adapted to be projected, a wedge shaped member supported for movement in the plane of the opening for holding the saw in position, means for varying the lateral wedging action of the wedge member, and means to force said wedge shaped member into the opening.

3. In combination with an anvil, means for supporting the same, a swaging die supported for rotation, and the means to rotate the same, a member for clamping the saw against said first means supported for vertically swinging and for sliding laterally toward and from the saw, said member having an inclined outer face, and relatively fixed means disposed to be engaged by the inclined face of said member, whereby as said member is swung upwardly it will also be moved in a lateral direction.

4. In an apparatus of the character described, a housing open at one side, a carrier in said housing provided with an anvil, a swaging die in said housing, means for operating said swaging die, a plate extending over the open side of said housing, said housing having its lower portion formed with an opening for reception of the saw teeth, a member having its outer face inclined, a pin by which said member is pivotally supported on said plate, said pin being slidably supported in said plate, a spring tending to draw said pin in an outward direction, and means to swing said member.

5. The combination of a supporting frame, saw tooth swaging mechanism carried thereby, means for clamping the frame to a saw, tooth shaping mechanism mounted on the frame, and means connecting said clamping means with the shaping mechanism to operate the clamping means to clamp the frame to the saw on operation of the shaping device, and preliminary to actuation of the swaging mechanism.

6. In a device of the character described, the combination of a supporting frame, means for swaging a saw tooth, a clamp for securing the frame to the saw, saw tooth shaping means on the frame, a rotatable operating member for said shaping means, and a connection between the said rotatable member and said clamp adapted to operate the clamp on moving the rotatable member, whereby to firmly position the device on the saw preliminary to actuation of the swaging means.

7. An apparatus of the character described comprising a frame, means thereon for swaging the saw teeth, a carriage slidably supported on said frame for movement toward and from said means, means on said carriage for shaping the saw teeth and thereby adjustable to admit proper engagement of the shaping and swaging means with the saw, and means engaged with said carriage and with said frame for preventing forward movement of the frame on the carriage during operation of said first means.

8. In a device of the class described the combination of a support, relatively movable swaging and shaping mechanisms mounted thereon, means for adjusting and holding said mechanisms in proper positions with respect to separate teeth of a saw, clamping means for the swaging mechanism, and actuating means for the shaping mechanism adapted to operate the clamping means preliminary to swaging a saw tooth.

9. In a device of the class described the combination of swaging mechanism, shaping mechanism movable bodily relative to the shaping mechanism, whereby said mechanisms may be properly positioned with respect to various unequally spaced teeth of a saw, means for preventing movement bodily of the shaping mechanism with respect to the swaging mechanism, and operating devices for operation of the shaping and swaging mechanisms.

10. In a device of the class described the combination of a frame, swaging mechanism thereon, a carriage movable on the frame toward and from the swaging mechanism, shaping means on the carriage, and a chock for engaging the carriage and frame to hold the swaging and shaping mechanisms from movement relative to one another during operation thereof.

11. In a device of the class described the combination of a frame, swaging mechanism thereon, a carriage slidably supported on the frame, yielding means pressing the carriage toward the swaging mechanism, a hand grip on the carriage and fixed thereto, a pivoted hand grip thereon, shaping mechanism carried by the carriage and movable bodily relative to the swaging mechanism for the purpose set forth, operating devices for the respective swaging and shaping mechanisms, and a chock connected with the pivoted hand grip aforesaid and movable thereby into and out of engagement with the carriage and frame in order to position the carriage and shaping mechanism from movement with respect to the swaging mechanism.

Signed at Seattle, Wash., this 16th day of March 1908.

THEODORE W. CROSS.

Witnesses:
 FRANK E. ADAMS,
 STEPHEN A. BROOKS.